K. R. GITTERMAN.
SPECTACLES.
APPLICATION FILED FEB. 17, 1920.
1,348,713.
Patented Aug. 3, 1920.
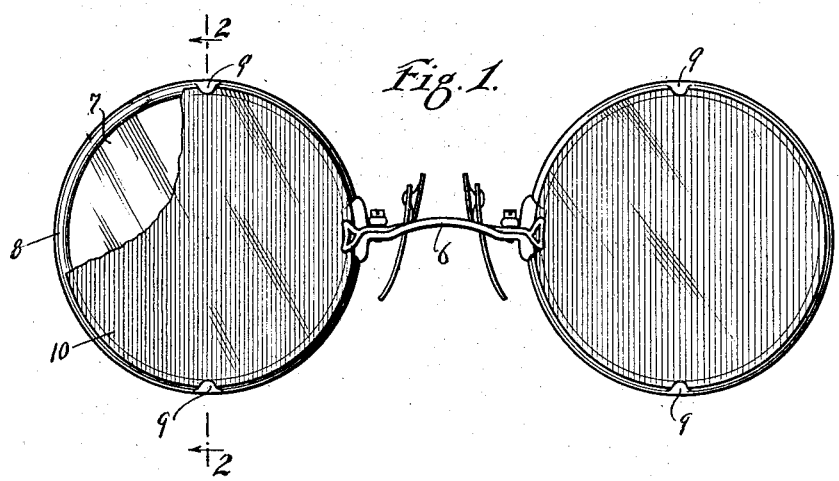
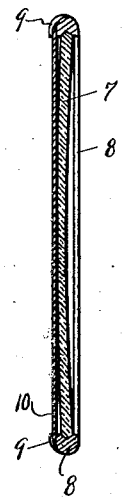
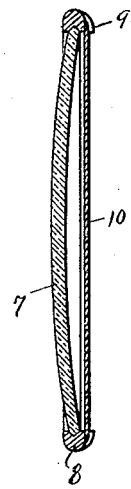
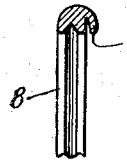
WITNESSES
INVENTOR
KURT R. GITTERMAN
BY
ATTORNEYS

UNITED STATES PATENT OFFICE.

KURT R. GITTERMAN, OF BROOKLYN, NEW YORK.

SPECTACLES.

1,348,713.     Specification of Letters Patent.     Patented Aug. 3, 1920.

Application filed February 17, 1920. Serial No. 359,292.

*To all whom it may concern:*

Be it known that I, KURT R. GITTERMAN, a citizen of the United States, and a resident of the city of New York, borough of Brooklyn, in the county of Kings and State of New York, have invented new and Improved Spectacles, of which the following is a full, clear, and exact description.

This invention relates to spectacles, and more particularly to detail construction and improvements in the frames of spectacles. Especially this invention appertains to a combination spectacle frame and shade.

The primary object of the invention is to produce new and improved spectacle frames which may be used in conjunction with eye shades so that a simple shade may be slipped into position on the spectacle frame and held in positive engagement therewith for toning down and softening the intensity of light for safe guarding weak eyes.

A further object of the invention is to produce a new and improved celluloid rim or ring for binding spectacle lenses to the end that the celluloid ring may have simplified means made thereon to hold the aforesaid shade.

With the above and other principal objects in view the invention has relation to the combination and arrangement of an eye shade with a spectacle frame or with a ring binding and lens as set forth in the appended claims defining this invention, described in the following specification, and illustrated in the accompanying drawings, wherein :—

Figure 1 shows a front or face view of a conventional type of spectacle with eye shades applied thereto, one of the shades being broken away to show a lens in elevation.

Fig. 2 shows a cross-sectional view taken on the line 2—2 of Fig. 1 to illustrate the application of an eye shade to the lens ring or frame, the shade being applied in this instance to a convex lens.

Fig. 3 likewise shows a cross-sectional view of the eye shade attached to a lens, more particularly for the purpose of showing how the shade is held in spaced position from a concave lens.

Fig. 4 illustrates a fragmentary detail view of a binder ring, usually made of celluloid, employed to grip the spectacle lens to disclose an integral hook made on the celluloid ring.

Referring now more in particular to the drawings for a more comprehensive disclosure of this invention, wherein the same parts throughout the several views are designated by identical reference characters, there is shown the usual form of spectacle bridge frame 6. The spectacle lenses 7 are provided as usual with a rim or ring 8 constructed of celluloid or other suitable material. The rims or rings 8 are usually flexible or resilient by nature of the material of which they are constructed, and are slipped in position on the spectacle lenses by slightly extending or stretching the ring until it snaps into position upon the spectacle lens. This operation of mounting the lens within the ring is known to those skilled in the art.

My invention more in particular relates to means in conjunction with any kind of spectacle ring or surrounding rim for holding a comparatively thin and light-weight eye shade on the lens for protecting the eyes from bright light and sun glare. This accomplishment of my invention is effected through the use of small hooks 9 made in the form of an integral lug or stud upon the celluloid ring. In the manufacture of the rings 9, whether they are made of celluloid, metal or other materials, there is integrally formed the hook 9 by any approved manufacturing method at the time the rings 8 are made at the factory and sold to the spindle trade. The hooks 9 are very small in size and are slightly spaced from the body of the ring, as more particularly shown in Fig. 4. Any number of hooks 9 may be made on the rim, and applied to either one or both sides thereof. It is more practical, however, to space the hooks diametrically opposite one another, as shown in Fig. 1. The hooks provide receptacles and positive holding means to receive an eye shade.

An eye shade 10 is cut from sheet celluloid, or may be made of any suitable transparent material. Celluloid is the most practical, since it is not easily broken and is comparatively inexpensive for this purpose. The celluloid eye shade 10 is cut about equal in size and shape to the lens 7 and ring 8 of the spectacle in order that it may be slipped into position and held by the hooks 9 provided for that purpose. The celluloid shade pieces 10 are shaded in any desirable color, such as emerald, amber, crimson, or otherwise to suit the particular desire of the manufacturer.

The eye shades 10 used in combination with spectacles having lens ring binders with hooks, will preserve and protect weak eyes from undue light intensity and relieve one of the necessity of carrying a separate pair of shade spectacles. The eye shades 10 are easy to remove and replace, and when not in use may be safely carried in the pocket or in a spectacle case. The small hooks 9 are so designed and constructed, and are of such minimal size as to be unnoticeable and not objectionable to any one who desires a new and improved combination spectacle.

Having thus described my invention, what I desire to secure by Letters Patent is:

1. A combination shade and spectacle, comprising spectacle frames, hooks provided on the spectacle frames, and an eye shade to slip into the hooks.

2. Frames for spectacle lenses, comprising a ring mounted on the lens, and hooks provided on the ring to receive and hold a shade.

3. Celluloid spectacle rims for binding lenses of spectacles, comprising a ring to be snapped in position on a lens, and integral hooks formed on the ring to hold an eye shade.

4. The combination with a celluloid binding rim for spectacle lenses of hooks formed on said rim, and a celluloid eye shade engagable by said hooks to hold the shade positioned over the lenses for protecting the eyes from the intensity of light.

5. A flexible binder rim for lenses, comprising a rim adapted to be snapped in position over the perimeter of a lens, and diametrically opposed hooks formed on said ring for the reception of a protective shade, whereby to position the same over the lens.

KURT R. GITTERMAN.